July 25, 1967  G. A. FRANCIS ETAL  3,333,124
INDUCTION MOTOR
Filed Sept. 29, 1964  2 Sheets-Sheet 1
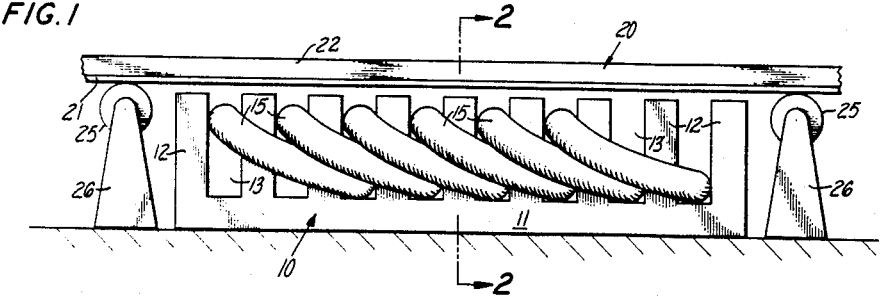
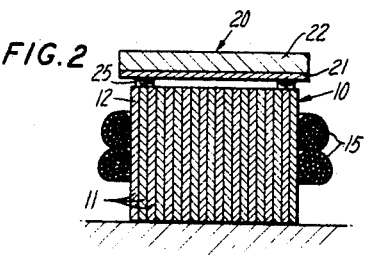
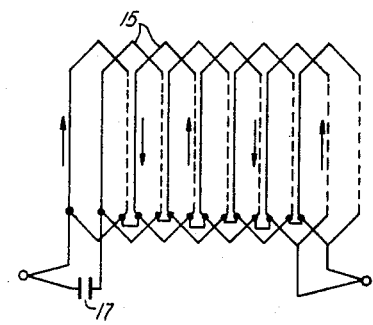
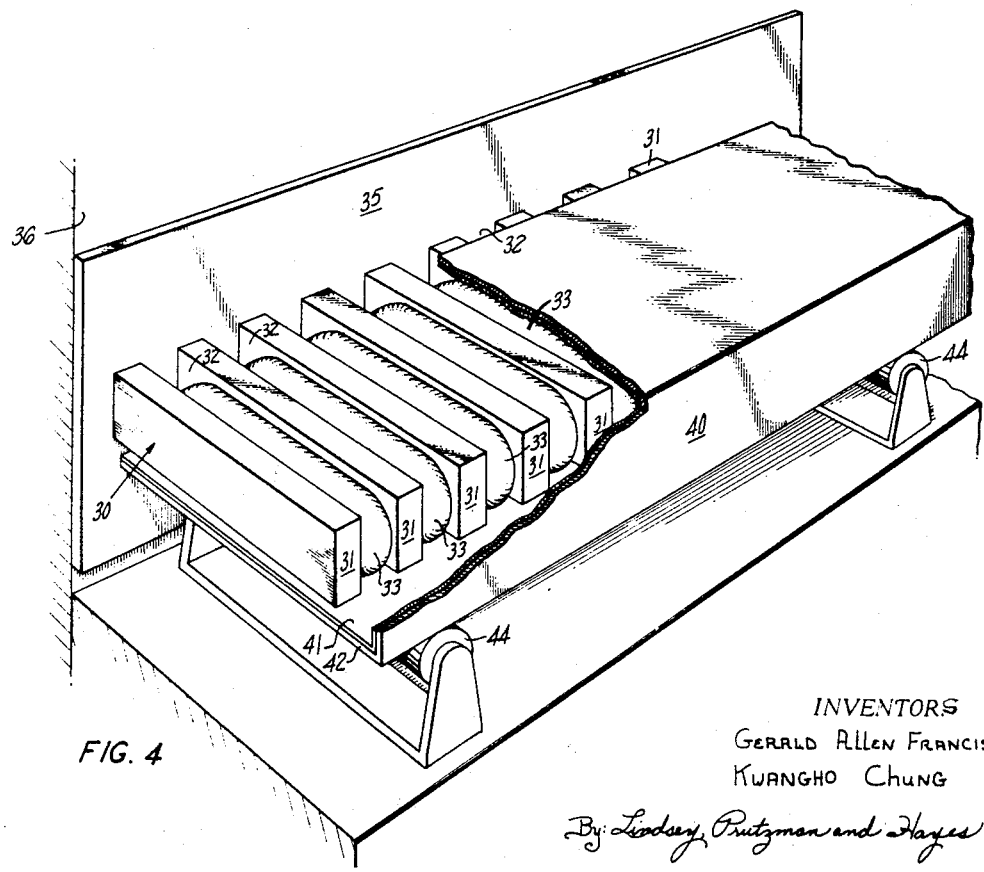
INVENTORS
GERALD ALLEN FRANCIS
KWANGHO CHUNG
By Lindsey, Prutzman and Hayes July 25, 1967  G. A. FRANCIS ET AL  3,333,124
INDUCTION MOTOR
Filed Sept. 29, 1964  2 Sheets-Sheet 2
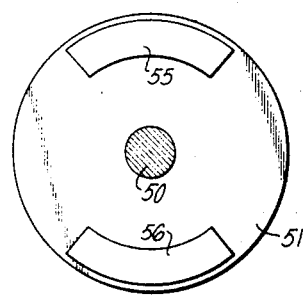
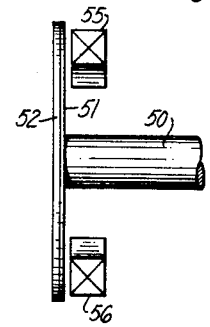
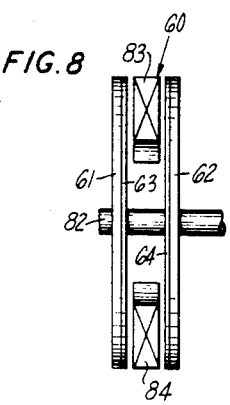
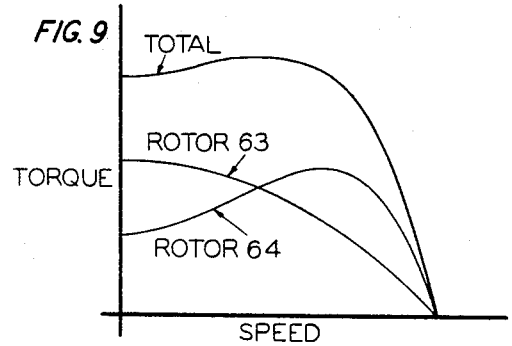
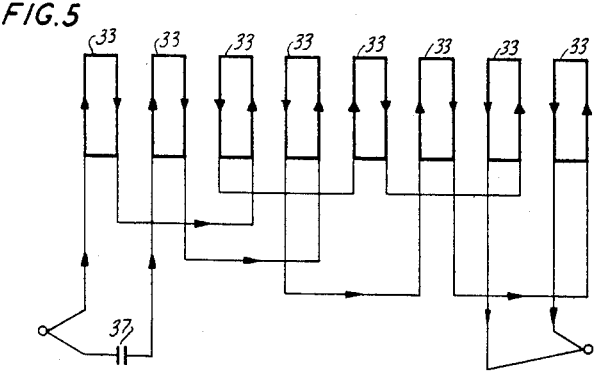
INVENTORS
GERALD ALLEN FRANCIS
KWANGHO CHUNG
By: Lindsey, Prutzman and Hayes

United States Patent Office 3,333,124
Patented July 25, 1967

3,333,124
INDUCTION MOTOR
Gerald Allen Francis, Columbus, Ohio, and Kwangho Chung, Hartford, Conn., assignors to Skinner Precision Industries, Inc., New Britain, Conn., a corporation of Connecticut
Filed Sept. 29, 1964, Ser. No. 400,175
3 Claims. (Cl. 310—13)

This invention relates generally to induction motors and is more particularly directed to induction motors of both the linear movement or "open-sided" type and the rotary movement or axial-air gap type.

It is a primary object of this invention to provide an improved induction motor having a generally flat configuration when constructed as either a rotary or linear motion producing device.

A further object of this invention is the provision of an improved induction motor having a generally flat configuration and capable of producing a high starting torque while operating at low synchronous and running speeds.

It is an additional object of this invention to provide an improved induction motor adaptable for both rotary or linear motion and having a modular stator construction which can be used in multiple form to cooperate with a single armature thereby to provide the desired torque or force characteristics.

It is another object of this invention to provide an improved armature construction suitable for use in both rotary and linear induction motors, which armature is of simple low-cost construction while being exceedingly durable in operation.

It is still another object of this invention to provide an improved linear induction motor which is susceptible of producing unlimited linear movement as well as combinations of rectilinear and rotary movement.

It is another object of this invention to provide an improved induction motor which can be effectively reversed in its direction of operation at very high reverse cycle rates without damage to the motor.

It is a still further object of this invention to provide an improved induction motor having an extremely low mass armature.

It is another object of this invention to provide an improved induction motor having simplified double armature construction.

It is a still further object of the invention to provide an improved induction motor having a generally flat configuration when constructed as either a rotary or a linear motion-producing device, which motor is simple in construction, durable and reliable in operation and easily manufactured at low cost.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a side elevation view of an open-sided motor constructed in accordance with the present invention;

FIG. 2 is a cross section view taken generally along the lines 2—2 of FIG. 1;

FIG. 3 is a schematic wiring diagram for the motor of FIG. 1;

FIG. 4 is a perspective view, partially broken away, of another embodiment of the linear motor of this invention;

FIG. 5 is a schematic coil wiring diagram for the motor of FIG. 4;

FIG. 6 is a schematic view of an axial air gap motor of this invention utilizing two modular stator members;

FIG. 7 is an end view of the motor schematically illustrated in FIG. 6;

FIG. 8 is a schematic view of a motor of the type illustrated in FIGS. 6 and 7 having two rotors; and FIG. 9 is a speed torque curve of a two rotor induction motor.

The induction motor of this invention has utility with applications requiring both linear and rotary movement and for purposes of convenience, the type of motor which produces rotary movement is referred to as an axial air gap motor and the type of motor which produces linear movement is referred to as an open-sided motor, and in both cases the driving member is referred to as the stator and the driven member is referred to as the armature.

For a better understanding of the present invention, attention is first directed to FIGS. 1–3 wherein an open-sided motor particularly suited for producing rectilinear motion is described. The motor of FIG. 1 is shown as comprising a driving member or stator generally designated 10 having a ferromagnetic core formed from a plurality of identical toothed laminations 11 which are suitably stacked and secured together to define poles 12 and slots 13. The slots receive field coils 15 which are of conventional coiled electrical conductor configuration arranged in the stator slots to form a two layer single coil lap wound stator. The field coils 15 are electrically interconnected with capacitor 17 for connection to a single phase AC source thereby to produce an electromagnetic field which in accordance with conventional induction motor theories, moves along the active surface; i.e., the toothed surface of the stator. The illustrated stator configuration can, of course, be varied in accordance with conventional induction motor techniques, as for example, modification of pole configuration, slot construction, lamination arrangement and the manner of arranging the coils in the slots. Similarly the coils can be connected for energization from any suitable multiphase source, it being necessary only to produce an electromagnetic field that moves along the stator. Such stators can also be made as linear or semi-circular modules and each such module can be one or even several pole spans in length.

The armature or driven member of the open-sided motor of FIG. 1 is generally designated 20 and comprises a continuous conductor 21 formed of any suitable conductive material such as copper or aluminum. In its preferred form, the conductor is a continuous sheet coextensive with the active surface of the stator and extending throughout the full desired length of relative movement between the stator and the armature. In the illustrated embodiment, a ferromagnetic member 22, preferably of laminated construction is arranged co-extensive with the conductor 21 and secured thereto to form the return path for electromagnetic flux produced by the stator 10.

A support for the armature 20 is schematically illustrated as a pair of rollers 25 suitably supported by pedestals 26 and several of such supports can be provided to support the armature throughout its range of movement relative to the stator.

Utilization of a continuous copper sheet has the effect of producing an infinite number of conductors which are cut by the pulsating flux produced by the stator 10. In accordance with conventional induction motor theories, a current is induced in each of the infinite number of conductors in conductive plate 21 that is cut by the stator flux to produce movement of the armature in the direction of travel of the magnetic field produced by the stator.

The open-sided motor of FIG. 4 illustrates what is conveniently referred to as a two-sided motor, because the stator is provided with two primary active surfaces. More specifically, stator 30 is constructed (preferably of laminated ferromagnetic material) to provide a plurality of spaced poles 31 separated by slots 32 into each of which is placed a coil winding 33. The stator is shown as being supported on a mounting plate 35 which is secured to a suitable mounting surface 36 although the mounting and support structures form no part of this invention. The windings 33 can be connected as in FIG. 5 with a phase shifting device such as capacitor 37 and to a suitable AC source to produce an electromagnetic field which travels in the same direction on both active surfaces of the stator. The armature or driven member 40 is similar in construction to the armatures heretofore described except that it has a generally U-shaped cross section. The armature 40 is provided with a continuous conductive inner plate surface 41 of copper or the like and a continuous ferromagnetic flux return path 42, the two being suitably joined together for simultaneous movement. Support and alignment of the armature 40 relative to the stator 30 so as to provide the desired relative movement can be achieved in any suitable manner such as rollers 44. In accordance with conventional induction motor theories as discussed in conjunction with the motor of FIGS. 1-3, an alternating electromagnetic flux is produced by the spatially displaced stator coils to induce a current in the conductive portion of the armature. A force is produced which will move the armature [assuming the stator to be fixed in position] in the direction of movement of the electromagnetic field along the two active surfaces of the stator.

Many armature-stator assembly configurations can be provided without departing from the present invention. In FIG. 1 a stator having a single active surface is provided to cooperate with a generally flat, plate-like armature to produce linear motion. In FIG. 4, a stator having two active surfaces is shown as cooperating with a generally U-shaped armature that utilizes both active surfaces of the stator, although only a single active surface could be utilized if desired.

In FIGS. 6 and 7 there is illustrated an open-sided motor to produce a rotary output. Such a motor is shown as comprising a rotatably supported shaft 50 to which is secured a continuous conductive disc 51 and a ferromagnetic disc or plate 52 which cooperates to form the rotor of an axial air gap motor. This embodiment of the invention shows the modular nature of the stator of this invention and shows a pair of stators 55 and 56 each of which is identical to the other and is constructed in arcuate form and in accordance with the teachings of any of the heretofore described stator embodiments to place an active stator surface adjacent the conductive disc. No support structure is shown for the rotor and stators but such structure can be as desired. A single stator module can also be utilized or more than two such modules can be utilized in order to obtain the desired motor characteristics. The operation of this embodiment is in accordance with the induction motor principles heretofore described wherein the coils of each stator are connected to a multi-phase alternating current source to produce a travelling magnetic field which induces currents in the conductive disc. Of course, each stator must be energized to produce a magnetic field travelling in the same direction.

To further illustrate the flexibility of the induction motor constructions described, FIG. 8 discloses a second rotor which cooperates with the other active surface of a stator 60 such as described in connection with the embodiment of FIG. 4. The rotor discs 61 and 62 are identical except that the continuous conductive discs or plates 63 and 64 face each other and are rigidly connected to shaft 82. By suitable provision of coaxial shafts (not illustrated) the single stator members 83 and 84 can drive the rotors independently to provide two outputs.

A further variation permits simulation of the so-called double squirrel-cage motor action and in such event the copper disc winding of the rotor 63 is provided with a different impedance from that of the rotor 64. For example, rotor 63 can be provided with a conductive sheet of relatively high resistance whereas the rotor 64 is provided with a sheet of relatively low resistance. With both rotors rigidly connected to the shafts 82, the resultant speed torque curve for the motor is as shown in FIG. 9 wherein the total torque at a given speed is the sum of the torques provided by each rotor thereby permitting "construction" of a desired speed torque curve with the motors of this invention.

In each of the foregoing embodiments of this invention the rotor utilized a conductive sheet or disc devoid of the high construction costs and other problems produced by conventional motors having discrete armature windings. If desired, in each of the described embodiments the armature iron can be held independently in position such that only the conductive elements moves thereby providing an extremely low mass and low cost movable element.

As will be apparent to persons skilled in the art, various modifications and adaptations of the structure above described will become readily apparent without departure from the spirit and scope of the invention, the scope of which is defined in the appended claims.

We claim:

1. An induction motor comprising an elongated stator having a ferromagnetic structure and a plurality of coils of wire distributed along its length to form two oppositely disposed active stator surfaces; means for connecting said coils to a multi-phase source of alternating current to produce an electromagnetic field that moves in the same direction along the length of both active stator surfaces; a continuous conductive member on both sides of said stator coextensive with the active surfaces thereof, said stator and conductive member being supported for relative movement; a ferromagnetic member coextensive with the active surfaces of said stator and disposed on the opposite side of said conductive member relative to said stator active surfaces.

2. The induction motor as set forth in claim 1 wherein said conductive member is U-shaped and extends throughout the desired length of relative movement between the stator and conductive member.

3. The induction motor as set forth in claim 2 wherein said ferromagnetic member is coextensive with said conductive member and secured thereto.

References Cited

UNITED STATES PATENTS

| Re. 12,700 | 10/1905 | Zehden | 310—13 |
|---|---|---|---|
| 547,069 | 10/1895 | Gorges | 310—268 X |
| 1,881,014 | 10/1932 | Ayers | 310—13 X |
| 1,881,015 | 10/1932 | Ayers | 310—13 X |
| 2,112,264 | 3/1938 | Bowles et al. | 310—13 X |
| 2,337,430 | 12/1943 | Trombetta | 310—13 |
| 2,638,347 | 5/1953 | Maggi | 310—12 X |
| 2,831,131 | 4/1958 | Klotz | 310—13 |
| 2,897,387 | 7/1959 | Welter | 310—268 |
| 3,194,032 | 7/1965 | Von Brimer | 310—13 X |
| 3,223,867 | 12/1965 | Shapiro | 310—268 X |

MILTON O. HIRSHFIELD, *Primary Examiner.*

D. F. DUGGAN, *Assistant Examiner.*